Figure 10:
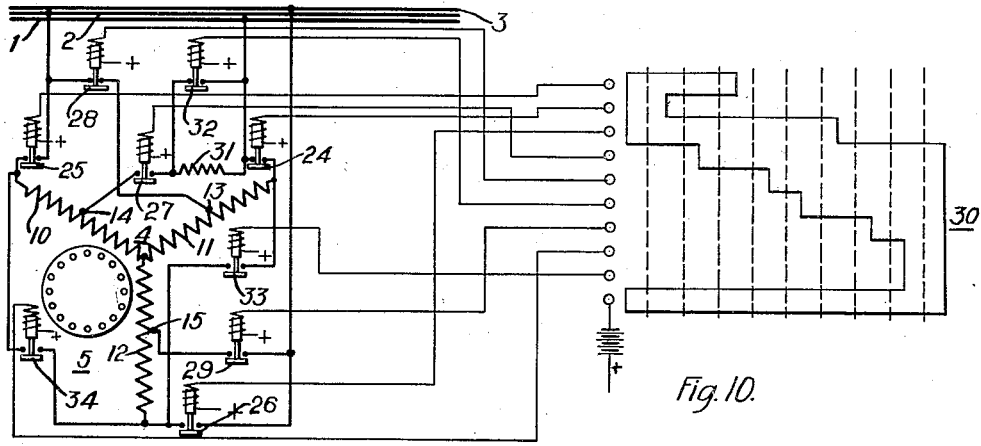

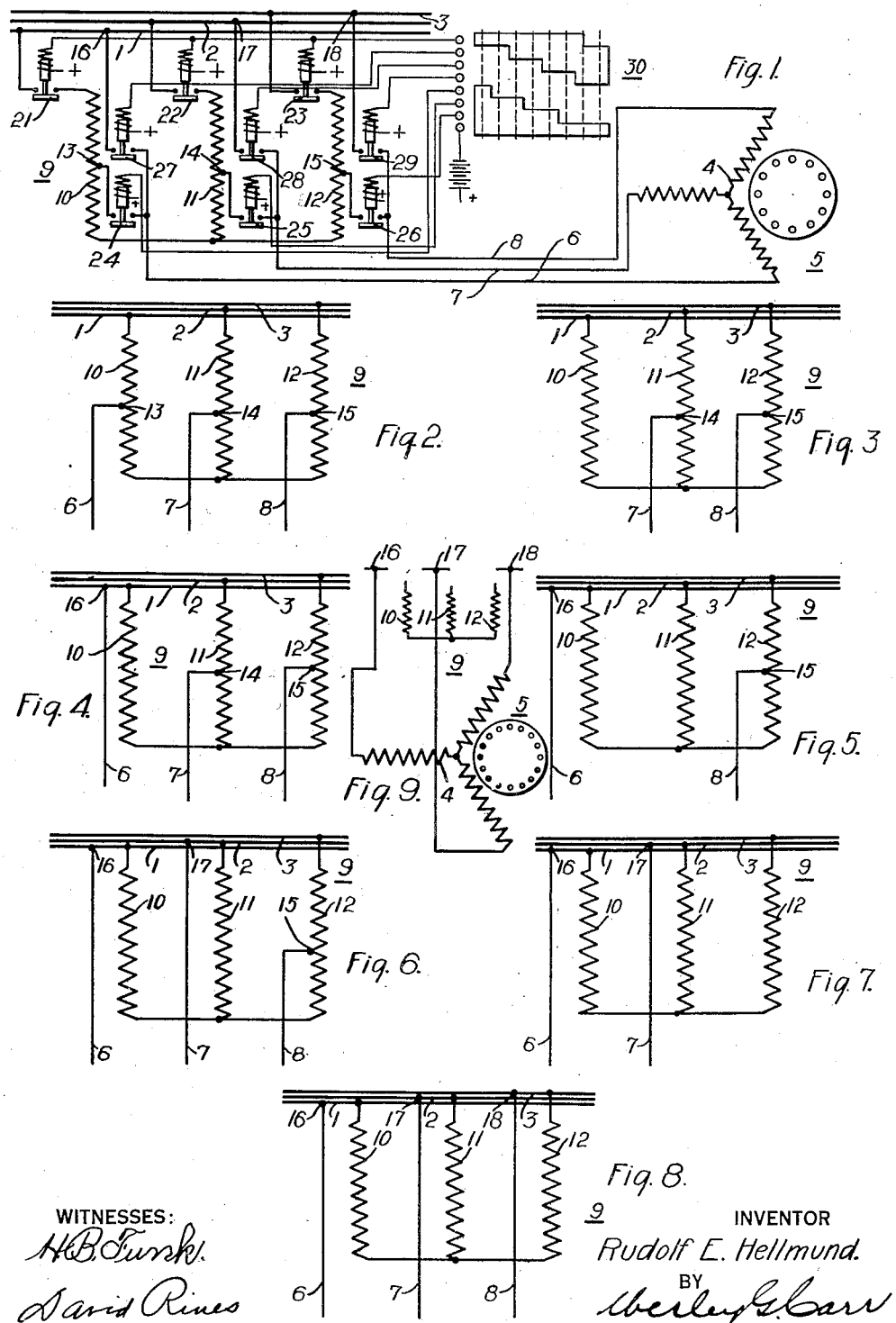

June 26, 1923.

R. E. HELLMUND

MOTOR CONTROL SYSTEM

Filed Oct. 8, 1918

1,460,157

2 Sheets-Sheet 2

WITNESSES:
H. B. Funk
David Rines

INVENTOR
Rudolf E. Hellmund.
BY
ATTORNEY

Patented June 26, 1923.

1,460,157

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed October 8, 1918. Serial No. 257,348.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Motor-Control Systems, of which the following is a specification.

My invention relates to control systems for alternating-current motors and particularly to systems for effecting changes of connections of the motor windings to the line.

In the operation of starting induction motors it is customary first, to subject the primary windings of the motor to a reduced voltage by connecting the motor to the line through a transformer, and then to subject these windings to a higher operating voltage usually the line voltage, in which case the transformer is subsequently disconnected. During the transition from low to high voltage the circuit of the primary motor windings is usually opened. Upon the interruption of the primary circuit, with the secondary windings short-circuited, the motor field is maintained energized for an interval of time by currents flowing in the secondary circuit. This field, particularly if the motor is carrying a load, does not rotate with synchronous speed but with the somewhat lower speed of the rotor. At the moment of reclosing the primary circuit, therefore, it may occur that the primary and the secondary windings are of opposite polarity, causing excessive currents and the well known inconveniences attendant thereupon. This effect may be avoided by accomplishing the transition from low to high voltage without disconnecting the motor from the line.

Again, in the operation of adjustable-speed induction motors, it is usually necessary to change the line connections from one set of terminals to another set in order to change the speed. In this as well as in the previous case, a transition without loss of torque during the transition is very desirable in a good many applications such, for instance, as control systems for elevator motors in which it is desired that, at no moment, shall the motor be out of the positive control of the operator and in gear drives in order to avoid mechanical shocks and consequent damage to the gears and other parts.

My invention has for its object to provide a novel control system by means of which many such changes may be effected without disconnecting the motor or other translating device from the line. It is another object of my invention to accomplish this with a minimum number of switches and control devices. According to my invention, the circuit transition is effected by changing each phase individually from the one voltage to the other, so that at least one phase is always closed and the proper phase relation between the motor and the line thus always maintained.

My invention has the further advantage that the transition is accomplished without loss of torque.

For the purpose of explaining my invention, I have herein illustrated it as employed first, in connection with a starting system for induction motors and secondly, in connection with a 2-speed induction motor, the primary windings of which are arranged for series and parallel star connections. It will be understood, however, that my invention is of more general application, applicable alike to induction motors and to motors of the polyphase commutator type and that the described embodiments are illustrative purely.

In the accompanying drawings, Figure 1 is a diagrammatic view of a starting system for an induction motor, the control circuits being arranged according to my invention; Figs. 2 to 9 are diagrammatic views of the circuits illustrating the sequence of operations; Fig. 10 is a diagrammatic view of a 2-speed induction motor having my invention applied thereto and Figs. 11 to 18 are views similar to Figs. 2 to 9.

Referring particularly to Figs. 1 to 9, line conductors 1, 2 and 3 of a three-phase transmission line, which may be connected to any suitable source of electrical energy, supply current to the primary windings 4 of an induction motor 5, either of the squirrel-cage, or of the wound-rotor type. The windings 4 are shown as connected to the line conductors 1, 2 and 3, by conductors 6, 7 and 8, through the medium of a transformer 9 having three legs 10, 11 and 12. In the process of starting the motor, the conductors 6, 7 and 8 are connected to the line conductors 1, 2 and 3 first, through the transformer 9, at the intermediate points 13, 14 and 15 of the legs of the transformer, and later, directly to the conductors 1, 2 and 3 at 16, 17 and 18, respectively. Switches 21, 22 and 23, of the electromagnetic, cam-operated or any other desired type, serve to connect the line conductors 1, 2 and 3 to the legs of the transformers 10, 11 and 12. The connections of the motor conductors 6, 7 and 8 to the intermediate points 13, 14 and 15 of the transformer may be effected by means of switches 24, 25 and 26. The ultimate connections to the line may be effected through the switches 27, 28 and 29. I have herein illustrated these switches as of the electromagnetic type, the circuits of the coils of which are closed by a drum controller 30.

The operation is as follows: The switches 21 to 26 will be closed in the first position of the controller 30 to connect the primary windings 4 to the line conductors 1, 2 and 3 at low voltage through the transformer 9. The connections are as illustrated in Fig. 2. Upon moving the controller to the second position, the switch 24 will be opened, resulting in the connections diagrammatically shown in Fig. 3. A movement of the controller another step will cause the closing of the switch 27, with the consequent resulting connections shown at Fig. 4. Two of the phase windings of the motor are now connected to the line at low voltage and one at high. Similarly, successive actuations of the controller will cause the opening of the switch 25 (Fig. 5), the closing of the switch 28 (Fig. 6), the opening of the switch 26 (Fig. 7) and the closing of the switch 29 (Fig. 8). The motor is now in parallel with the transformer 9. In the last position of the controller, the switches 21, 22 and 23 are opened, resulting in the connections illustrated at Fig. 9, the motor being directly connected, at high voltage, to the line conductors 1, 2 and 3 and the transformer 9 being disconnected therefrom.

I thus provide a means for changing the connections of the motor-winding conductors from the mid-points of a multi-phase transformer winding to the terminals thereof without at any time completely severing the connections.

Figure 18:
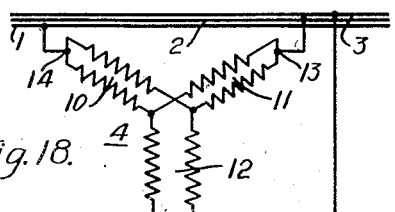

In Figs. 10 and 18, I have illustrated my invention as applied to a two-speed induction motor 5, the primary windings 4 of which, having legs 10, 11 and 12, are arranged for series and parallel-star connections. The switches 24, 25 and 26 are adapted to close to connect the motor to the line conductors 1, 2 and 3 for low-speed operation. The switch 27 may be closed to connect an intermediate point 14 of the leg 10 to the line conductor 1 through an inductive winding or other impedance 31. This winding may be short-circuited by a switch 32 after the danger of short-circuiting a portion of the windings 4 has been eliminated. The switch 28 may be closed to connect an intermediate point 13 of the leg 11 to the line conductor 2. I thus provide for reversing the phase relations of the legs 10 and 11. The switch 29, upon closing, connects an intermediate point 15 of the leg 12 to the line conductor 3. The switches 33 and 34 may be closed to connect the terminals of the legs 10, 11 and 12 to a second star point.

Figure 11:
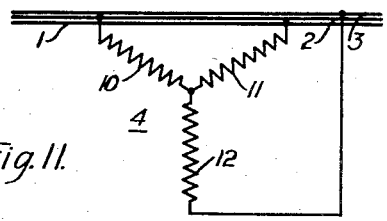

The drum controller 30 is diagrammatically illustrated as closing, in its first position, the switches 24, 25 and 26 to connect the windings 4 in series-star relation, and the motor, therefor, for low-speed operation (Fig. 11).

Figure 12:
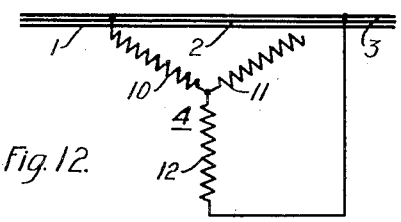
Figure 13:
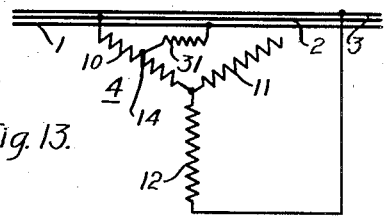
Figure 14:
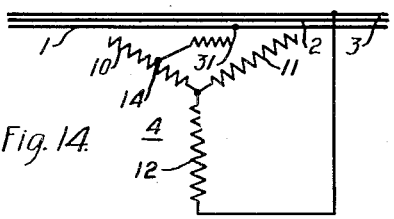
Figure 15:
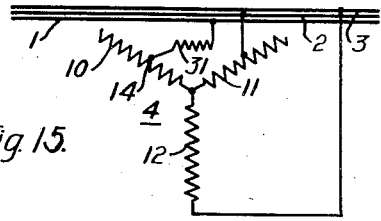
Figure 16:
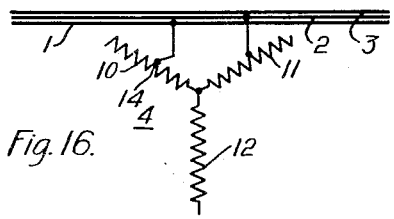
Figure 17:
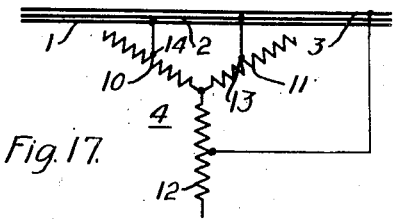

To effect the transition changes from high-speed operation, the controller is first actuated to its second operating position in which the switch 24 is opened (Fig. 12). Another step of the controller causes the closing of the switch 27 (Fig. 13); the leg 11 is now disconnected from the line conductor 1 and the intermediate point 14 of the leg 10 is connected thereto through the inductive coil 31. The use of the coil 31 avoids a near short-circuit while the terminal of the leg 10 is connected to the line conductor 2 and its mid-point 14 to the line conductor 1. The next operation of the controller causes the opening of the switch 25 and the consequent disconnection of the leg 10 from the line conductor 2 (Fig. 14), and another step, through the closing of the switch 28, the connecting to this line conductor 2 of the intermediate point 13 of the leg 11, (Fig. 15). The next position of the controller causes the closing of the switch 32 to short-circuit the inductive winding 31, and still another step, by opening the switch 26, the disconnecting of the leg 12 from the line conductor 3. (Fig. 16). The next operation of the controller causes the closing of the switch 29 (Fig. 17). The terminal points of the legs 10, 11 and 12 are now disconnected from the line conductors 1, 2 and 3 and the intermediate points 13, 14 and 15 are connected thereto with a phase reversal between the legs 10 and 11. The last point of the controller causes the closing of the switches 33 and 34 to effect the parallel-star connection of Fig. 18.

The changes of connections are thus effected for one phase winding at a time without, at that time, opening the circuits of the other phase windings, which results in effecting the transition without loss in torque.

The connections above described may obviously be effected in the reverse order when desired.

I claim as my invention:

1. The combination with a two-speed induction motor having star-connected phase windings, and a source of electrical energy therefor, of means for connecting said motor to said source for operation at one speed, means for reversing the phase sequence of two of said phase windings, and means for successively changing the connections of the phase windings of said motor to operate said motor at a second speed.

2. The combination with a two-speed induction motor having star-connected phase windings, and a source of electrical energy therefor, of means for connecting said motor to said source for operation at one speed, means for reversing the phase sequence of two of said phase windings, and means for successively changing the connections of the phase windings of said motor to operate said motor at a second speed while maintaining a circuit from said source through portions of two of said phase windings.

3. The method of operating a polyphase motor having star-connected phase windings, which consists in connecting the terminals of each of said windings to a source of electrical energy, successively disconnecting the terminals of said winding from said source, connecting an intermediate point of each of said windings to said source in such manner as to reverse the phase sequence of two of said phase windings, and connecting the terminals of said phase windings to a common point.

4. The method of operating a polyphase induction motor having star-connected windings, which consist in successively disconnecting certain of said phase windings from said source, reconnecting an intermediate point of each of said phase windings to said source in such manner as to reverse the phase sequence in said windings and to maintain a circuit from said source through portions of at least two of said phase windings during said transition, connecting an intermediate point of a third of said phase windings to the source of energy, and connecting the terminals of said windings to a common point.

5. The method of operating a polyphase motor having star-connected windings, which consists in connecting the terminals of said windings to a source of polyphase electrical energy, disconnecting one of said phase windings from said source, connecting one terminal of an impedance device to the phase from which said first named windings is disconnected and the other terminal of said device to an intermediate point of a second of said phase windings, disconnecting said second winding from said source, connecting the intermediate point of said first named phase winding to the phase of said source from which said second phase winding is disconnected, bridging said impedance device, disconnecting a third of said phase windings from said source and connecting an intermediate point of said third phase winding to a third phase of said source, and connecting the terminals of said phase windings to a common point.

In testimony whereof, I have hereunto subscribed by name this 30th day of Sept., 1918.

RUDOLF E. HELLMUND.